(12) United States Patent
Mochizuki et al.

(10) Patent No.: US 9,813,703 B2
(45) Date of Patent: *Nov. 7, 2017

(54) COMPRESSED DYNAMIC IMAGE ENCODING DEVICE, COMPRESSED DYNAMIC IMAGE DECODING DEVICE, COMPRESSED DYNAMIC IMAGE ENCODING METHOD AND COMPRESSED DYNAMIC IMAGE DECODING METHOD

(71) Applicant: RENESAS ELECTRONICS CORPORATION, Kawasaki-shi, Kanagawa (JP)

(72) Inventors: Seiji Mochizuki, Kanagawa (JP); Junichi Kimura, Koganei (JP); Masakazu Ehama, Sagamihara (JP)

(73) Assignee: Renesas Electronics Corporation, Tokyo (JP)

( * ) Notice: Subject to any disclaimer, the term of this patent is extended or adjusted under 35 U.S.C. 154(b) by 460 days.

This patent is subject to a terminal disclaimer.

(21) Appl. No.: 14/478,661

(22) Filed: Sep. 5, 2014

(65) Prior Publication Data

US 2014/0376636 A1 Dec. 25, 2014

Related U.S. Application Data

(62) Division of application No. 13/203,727, filed as application No. PCT/JP2009/000969 on Mar. 4, 2009, now Pat. No. 8,958,479.

(51) Int. Cl.
*H04N 19/56* (2014.01)
*H04N 19/169* (2014.01)
(Continued)

(52) U.S. Cl.
CPC ..... *H04N 19/00733* (2013.01); *H04N 19/136* (2014.11); *H04N 19/51* (2014.11);
(Continued)

(58) Field of Classification Search
CPC ........... H04N 19/00733; H04N 19/136; H04N 19/51; H04N 19/563; H04N 19/61; H04N 19/85
See application file for complete search history.

(56) References Cited

U.S. PATENT DOCUMENTS

| | | | |
|---|---|---|---|
| 6,584,155 B2 * | 6/2003 | Takeda | G06T 7/2026 348/699 |
| 2005/0053290 A1 * | 3/2005 | Wada | H04N 19/563 382/233 |
| 2007/0009030 A1 * | 1/2007 | Song | H04N 19/46 375/240.12 |

FOREIGN PATENT DOCUMENTS

| | | |
|---|---|---|
| CN | 1578468 A | 2/2005 |
| EP | 1 503 597 A2 | 2/2005 |

(Continued)

OTHER PUBLICATIONS

Panusopone et al., "An Efficient Implementation of Unrestricted Motion Compensation in Video Encoder", 2007 IEEE International Conference on Acoustics Speech and Signal Processing, Apr. 15-20, 2007, pp. I-1005-I-1008.

(Continued)

*Primary Examiner* — Md Haque
(74) *Attorney, Agent, or Firm* — Shapiro, Gabor and Rosenberger, PLLC

(57) ABSTRACT

A compressed dynamic image encoding device is provided, in which a motion vector is generated by searching a reference image for an image area most similar to an image area of a video input signal; a motion-compensated reference image is generated from the motion vector and the reference image; a prediction residual is generated, by subtracting the motion-compensated reference image from the video input signal; the reference image is generated, by adding the motion-compensated reference image and the (Continued)

result of processing performed to the prediction residual; and an encoded video output signal is generated by the processing performed to the prediction residual. The reference image comprises on-screen reference images, located inside a video display screen, and an off-screen reference image located outside the video display screen, and the off-screen reference image is generated based on the positional relationship of plural similar reference images of the on-screen reference images.

14 Claims, 5 Drawing Sheets

(51) Int. Cl.
  *H04N 19/136* (2014.01)
  *H04N 19/583* (2014.01)
  *H04N 19/563* (2014.01)
  *H04N 19/51* (2014.01)
  *H04N 19/61* (2014.01)
  *H04N 19/85* (2014.01)

(52) U.S. Cl.
  CPC ........... *H04N 19/563* (2014.11); *H04N 19/61* (2014.11); *H04N 19/85* (2014.11)

(56) References Cited

FOREIGN PATENT DOCUMENTS

| EP | 1 729 520 A2 | 12/2006 |
|---|---|---|
| JP | 6-351001 A | 12/1994 |
| JP | 2003-219417 A | 7/2003 |
| WO | WO 2006/016788 A1 | 2/2006 |

OTHER PUBLICATIONS

Chen et al., "Repetitive and Morphological Padding for Object-based Video Coding", Proceedings of International Conference on Image Processing, 1997, IEEE, vol. 1, Oct. 26, 1997, pp. 373-376.

Extended European Search Report, with search opinion, issued European Patent Application No. 09841039.2, Aug. 9, 2012.

Examination Report issued Apr. 12, 2013, in European Patent Application No. 09841039.2.

Office Action dated Oct. 25, 2013, in Chinese Patent Application No. 200980157830.2.

European Search Report dated Jul. 16, 2014, in Application No. EP 14170348.8.

* cited by examiner

COMPRESSED DYNAMIC IMAGE ENCODING DEVICE, COMPRESSED DYNAMIC IMAGE DECODING DEVICE, COMPRESSED DYNAMIC IMAGE ENCODING METHOD AND COMPRESSED DYNAMIC IMAGE DECODING METHOD

TECHNICAL FILED

The present invention relates to a compressed dynamic image encoding device, a compressed dynamic image decoding device, a compressed dynamic image encoding method, and a compressed dynamic image decoding method, especially, relates to technology which is effective in improving the accuracy of an extended reference image when motion compensation from an off-screen peripheral area is enabled in compressed dynamic image encoding process or compressed dynamic image decoding process.

BACKGROUND ART

In the international standard dynamic image encoding methods, such as MPEG-2, MPEG-4, H.263, and H.264, inter-frame prediction coding is employed, in order to realize high encoding efficiency using a correlation in a time direction. The coding mode of a frame includes an I frame which is encoded without using inter-frame correlation, a P frame which is predicted from the I frame encoded in the past, and a B frame which can be predicted from two frames encoded in the past. The I frame is called an intra-frame independent frame, the P frame is called a unidirectional predictive frame, and the B frame is called a bidirectional predictive frame.

In the inter-frame prediction coding, the motion-compensated reference image (predicted image) is subtracted from a dynamic image, and a prediction residual after the subtraction is encoded. Coding process includes processing of orthogonal transform such as DCT (discrete cosine transform), quantization, and variable-length coding. Motion compensation (motion correction) includes processing of moving a reference frame of the inter frame prediction spatially. The processing of motion compensation is performed in units of blocks of a frame to be encoded. When there is no motion in an image content, there is no movement and a pixel at the same position as a pixel to be predicted is employed. When there is a motion, a most analogous block is searched for and the movement amount is defined as a motion vector. A block of motion compensation is a block of 16 pixels×16 pixels or 16 pixels×8 pixels in the MPEG-2 encoding method, a block of 16 pixels×16 pixels or 8 pixels×8 pixels in the H.263 encoding method, a block of 16 pixels×16 pixels, 16 pixels×8 pixels or 8 pixels×8 pixels in the MPEG-4 encoding method, and a block of 16 pixels×16 pixels, 16 pixels×8 pixels, 8 pixels×16 pixels, 8 pixels×8 pixels, 8 pixels×4 pixels, 4 pixels×8 pixels, or 4 pixels×4 pixels in the H.264 encoding method.

In the MPEG-2 encoding method, since the motion vector is not allowed to depart from the inside of a screen, the MPEG-2 encoding method has a drawback that accurate motion compensation is not possible when an actual motion occurs from the outside of the screen. On the contrary, in the encoding methods of MPEG-4, H.263, and H.264, an unrestricted motion vector is adopted, which allows motion compensation from a peripheral area outside the screen.

On the other hand, Patent Literature 1 cited below describes that a reference image output means which outputs a motion compensated pixel to a motion vector is provided with a peripheral pixel prediction means which predicts a peripheral pixel of a reference image, so that it is possible to detect a motion vector by which a part of a block of a prediction pixel or a block of a motion compensated pixel indicates the outside of the reference image.

Patent Literature 1 describes also that an extended reference image as a peripheral image of the reference image is given by a mean value of all the pixel values of the reference image or by a pixel value of the closest reference image.

CITATION LIST

Patent Literature (Patent Literature 1) Japanese Patent Laid-open No. Hei 06 (1994)-351001

DISCLOSURE OF INVENTION

Problems to be Solved by the Invention

The present inventors have engaged in the research and development on a next-generation international standard dynamic image encoding system, in advance of the present invention.

FIG. 1 illustrates a configuration of a compressed dynamic image encoding device (encoder) based on the international standard dynamic image encoding system, which has been examined by the present inventors in advance of the present invention.

The compressed dynamic image encoding device (encoder) 1000 illustrated in FIG. 1 comprises a subtractor 1, an orthogonal transformer 2, a quantizer 3, an encoder 4, an inverse quantizer 5, an inverse orthogonal transformer 6, an adder 7, a motion compensation unit 8, a motion vector searching unit 9, and a frame memory 10.

A video input signal to be encoded is supplied to one input terminal of the subtractor 1 and an input terminal of the motion vector searching unit 9. The motion vector searching unit 9 performs motion estimation (ME), and generates a motion vector from the output terminal thereof. The motion vector is supplied to the motion compensation unit 8 which performs motion compensation (MC), and to the encoder 4 which performs a signal processing of variable-length coding (VLC). An output signal of the motion compensation unit 8 is supplied to the other input terminal of the subtractor 1, and to one input terminal of the adder 7. An output signal of the subtractor 1 is supplied to an input terminal of the orthogonal transformer 2 which performs orthogonal transform, such as a discrete cosine transform (DCT). An output signal of the orthogonal transformer 2 is supplied to an input terminal of the quantizer 3 which performs a quantization processing. An output signal of the quantizer 3 is supplied to an input terminal of the encoder 4, as well as to the other input terminal of the adder 7, via the inverse quantizer 5 which performs an inverse quantization process, and the inverse orthogonal transformer 6 which performs inverse orthogonal transform, such as an inverse discrete cosine transform (IDCT). A video stream of MPEG as an encoded video output signal is generated from an output terminal of the encoder 4. A reference image (local decoded image) is generated from an output terminal of the adder 7 and stored in the frame memory 10. The reference image read from the frame memory 10 is supplied to the motion compensation unit 8 and the motion vector searching unit 9. In the motion vector searching unit 9, the reference image is searched for a block which matches most a block of the video input signal to be encoded, and the movement amount is outputted as a motion vector. The motion compensation unit 8 generates a motion-compensated reference image (predicted image) from the motion vector and the reference image read from the frame memory 10, and supplies it to the other input terminal of the subtractor 1. Accordingly, in the subtractor 1, a prediction residual is generated by subtracting the reference image (predicted image) from the video input signal. When a prediction error undergoes encoding process including orthogonal transform by the orthogonal transformer 2, quantization by the quantizer 3, and variable-length coding by the encoder 4, the video stream of MPEG as an encoded video output signal is generated from the output terminal of the encoder 4.

The encoding process mentioned above is performed for every image screen (frame or field), and the screen is subdivided into blocks (usually each having 16 pixels×16 pixels, and called a "macroblock" in MPEG) each serving as a processing unit. That is, in every block to be encoded, a most similar block (predicted image) is selected from the reference image which has been encoded, and a difference signal of the image (block) to be encoded and the predicted image is encoded (by the process such as orthogonal transform and quantization). The difference of the relative position between the block to be encoded in a screen and the prediction signal is called the motion vector.

As explained at the beginning, in the MPEG-2 encoding method, since the motion vector is not allowed to depart from the inside of a screen, the MPEG-2 encoding method has a drawback that accurate motion compensation is not possible when an actual motion occurs from the outside of the screen. For that reason, in the encoding method of MPEG-4, the unrestricted motion vector (UMV) is adopted, which allows motion compensation from a peripheral area outside the screen FIG. 2 is an explanatory drawing of an extended reference image in cases where the extended reference image as a peripheral image of a reference image as described in Patent Literature 1 is defined as a pixel value of the closest reference image, in order to realize the unrestricted motion vector (UMV) adopted in the MPEG-4 encoding method.

In FIG. 2, a boundary line 20 is a line which indicates a boundary between the inside of a screen and the outside thereof, a reference image 21 of an object exists in the screen inside the boundary line 20, and an extended reference image 22 generated from a pixel value of the closest reference image of the object exists in the outside of the screen, that is the outside of the boundary line 20.

However, the examination by the present inventors has revealed that the generation method of the extended reference image examined by the present inventors in advance of the present invention as illustrated in FIG. 2 has the following problems.

The extended reference image 22 as an image outside the screen generated by the method illustrated in FIG. 2 does not take into consideration a locating direction of the reference image 21 of the object in the screen. Therefore, the shape of the extended reference image 22 outside the screen differs often from an actual shape greatly. As a result, (1) it is clarified that there occurs a problem that the difference signal in the portion of the extended reference image becomes large. (2) It is also clarified that there occurs a problem that a pixel of the extended reference image can not be selected, causing an increase in the electric power of a difference signal and a decrease in encoding efficiency, in addition, that the magnitude and the direction of a motion vector of a block to be encoded become different from those of a motion vector of the neighboring block, causing an increase in the amount of code of the motion vector. As the result of these problems, the amount of information of the encoded video output signal generated from the compressed dynamic image encoding device (encoder) 1000 illustrated in FIG. 1 increases markedly. Consequently, degradation of reproduction image quality takes place in a constant amount of information codes, or if a certain reproduction image quality is to be maintained, the amount of information of the MPEG video stream increases.

As described above, the present invention is made based on the examination which has been performed by the present inventors in advance of the present invention.

Therefore, the purpose of the present invention is to improve the accuracy of an extended reference image, when motion compensation from an off-screen peripheral area is enabled in compressed dynamic image encoding process or compressed dynamic image decoding process.

Another purpose of the present invention is to reduce degradation of reproduction image quality and, at the same time, to reduce increase of the amount of information of an MPEG video stream in order to maintain a certain reproduction image quality.

The above and other purposes and new features will become clear from description of the specification and the accompanying drawings of the present invention.

Means for Solving the Problems

The following explains briefly typical inventions to be disclosed by the present application.

That is, in a compressed dynamic image encoding device according to a typical embodiment of the present invention, a motion vector is generated by searching a reference image read from a frame memory (10) for an image area most similar to an image area of a video input signal to be encoded.

A motion-compensated reference image as a predicted image is generated from the motion vector and the reference image read from the frame memory (10).

A prediction residual is generated by subtracting the motion-compensated reference image from the video input signal.

The reference image to be stored in the frame memory (10) is generated by adding the motion-compensated reference image and the result of processing of orthogonal transform, quantization, inverse quantization, and inverse orthogonal transform performed to the prediction residual.

In the compressed dynamic image encoding device (1000), an encoded video output signal is generated by the processing of orthogonal transform, quantization, and variable-length encoding performed to the prediction residual (refer to FIG. 3).

The reference image comprises on-screen reference images (A, B, C) located inside a video display screen, and an off-screen reference image (D) located outside the video display screen, and the off-screen reference image (D) is generated based on the positional relationship of plural similar reference images (A, B) of the on-screen reference images (A, B, C) (refer to FIG. 5).

Effects of Invention

The following explains briefly an effect obtained by the typical inventions to be disclosed in the present application.

That is, it is possible to improve the accuracy of an extended reference image, when motion compensation from an off-screen peripheral area is enabled in compressed dynamic image encoding process or compressed dynamic image decoding process.

EXPLANATION OF REFERENCE NUMERALS

Figure 1:
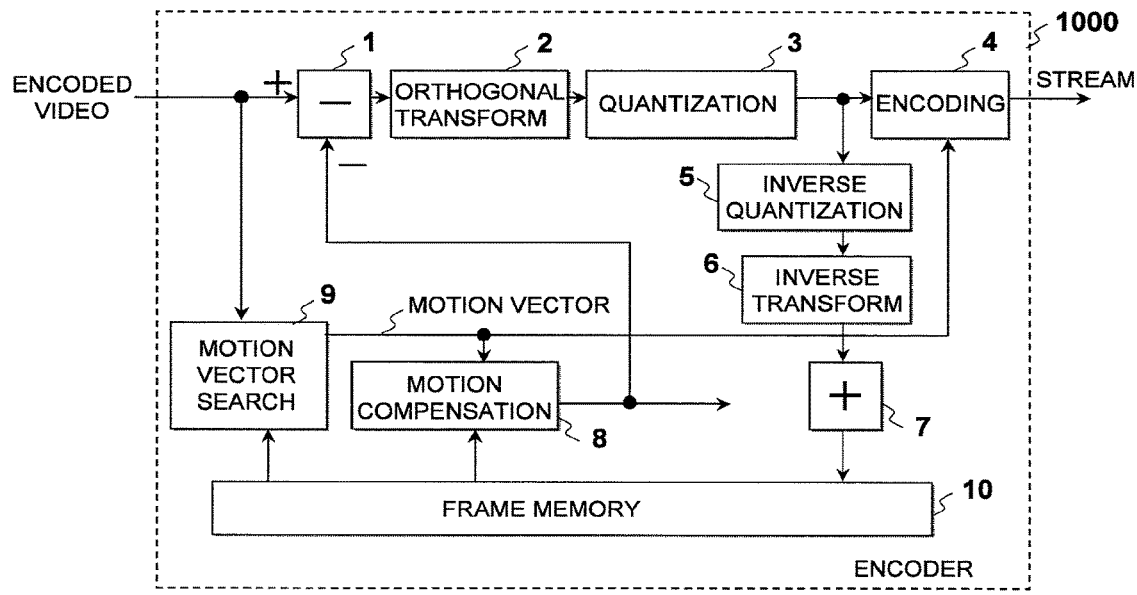
FIG. 1 is a drawing illustrating a configuration of a compressed dynamic image encoding device (encoder) based on the international standard dynamic image encoding system, which has been examined by the present inventors in advance of the present invention.
Figure 2:
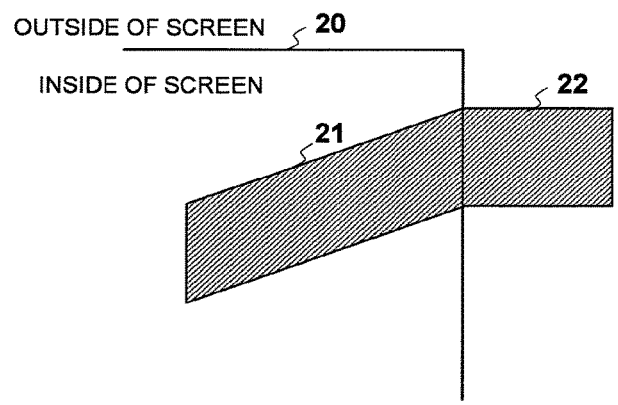
FIG. 2 is an explanatory drawing of an extended reference image in cases where the extended reference image as a peripheral image of a reference image as described in Patent Literature 1 is defined as a pixel value of the closest reference image, in order to realize the unrestricted motion vector (UMV) adopted in the MPEG-4 encoding method.

1000 Compressed dynamic image encoding device (encoder)
1 Subtractor
2 Orthogonal transformer
3 Quantizer
4 Encoder
5 Inverse quantizer
6 Inverse orthogonal transformer
7 Adder
8 Motion compensation unit
9 Motion vector searching unit
10 Frame memory
11 Reference image screen extension unit
111 Similarity calculating unit
112 Most similar pixel search unit
113 Off-reference-screen pixel generation unit
50 Boundary line between the inside of a reference screen and the outside
A, B, C Reference images located inside the boundary line 50
D Extended reference image located outside the boundary line 50
w Width of an extended reference image
60 Boundary line between the inside of a reference screen and the outside
61 Reference image of an object located inside the boundary line
62 Extended reference image located outside the boundary line
70 Compressed dynamic image decoding device (decoder)
71 Decoder
72 Inverse quantizer
73 Inverse orthogonal transformer
74 Motion compensation unit
75 Adder
76 Frame memory
77 Reference image screen extension unit
80 Compressed dynamic image decoding device (decoder)
81 Decoder
82 Inverse quantizer
83 Inverse orthogonal transformer
84 Motion compensation unit
85 Adder
96 Frame memory 86
L0 Boundary line between the inside of a reference screen and the outside
L1, L2, L3 Extended straight lines
90 Extended reference image located outside the boundary line L0
91 to 99 Many reference images located in a screen inside a reference screen

BEST MODE FOR CARRYING OUT THE INVENTION

1. Summary of the Embodiments

First, an outline of a typical embodiment of the invention disclosed in the present application is explained. A numerical symbol of the drawing referred to in parentheses in the outline explanation about the typical embodiment only illustrates what is included in the concept of the component to which the numerical symbol is attached.

(1) In a compressed dynamic image encoding device according to a typical embodiment of the present invention, a motion vector is generated by searching a reference image read from a frame memory (10) for an image area most similar to an image area of a video input signal to be encoded.

A motion-compensated reference image as a predicted image is generated from the motion vector and the reference image read from the frame memory (10).

A prediction residual is generated by subtracting the motion-compensated reference image from the video input signal to be encoded.

The reference image to be stored in the frame memory (10) is generated by adding the motion-compensated reference image and the result of processing of orthogonal transform, quantization, inverse quantization, and inverse orthogonal transform performed to the prediction residual.

Figure 3:
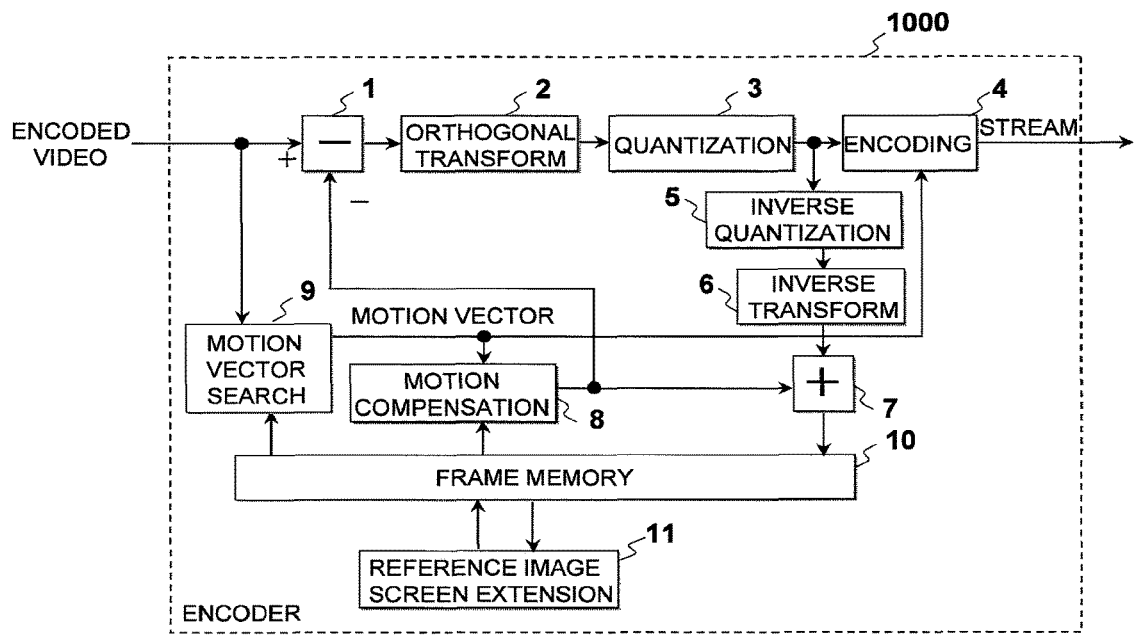
FIG. 3 is a drawing illustrating a configuration of the compressed dynamic image encoding device (encoder) according to Embodiment 1 of the present invention.

In the compressed dynamic image encoding device (1000), an encoded video output signal is generated by the processing of orthogonal transform, quantization, and variable-length encoding performed to the prediction residual (refer to FIG. 3).

The reference image comprises on-screen reference images (A, B, C) located inside a video display screen, and an off-screen reference image (D) located outside the video display screen. The off-screen reference image (D) is generated based on the positional relationship of plural similar reference images (A, B) of the on-screen reference images (A, B, C) (refer to FIG. 5).

According to the embodiment, the off-screen reference image (D) is generated based on the positional relationship of plural similar reference images (A, B) of the on-screen reference images (A, B, C); accordingly, it is possible to improve the accuracy of an extended reference image, when motion compensation from an off-screen peripheral area is enabled in compressed dynamic image encoding process.

In a preferred embodiment, one reference image (A) of the similar reference images (A, B) of the on-screen reference images (A, B, C) is located in close vicinity of the boundary line (50) between the on-screen reference image and the off-screen reference image.

Another reference image (B) of the similar reference images (A, B) is located inside the on-screen reference image, spaced out from the boundary line (50) farther than the one reference image (A).

The off-screen reference image (D) is located in the closest vicinity to the one reference image (A) across the boundary line (50).

A yet another reference image (C) of the on-screen reference images (A, B, C) is located in close vicinity to the another reference image (B), in positional relationship analogous to the positional relationship of the one reference image (A) and the off-screen reference image (D).

Figure 5:
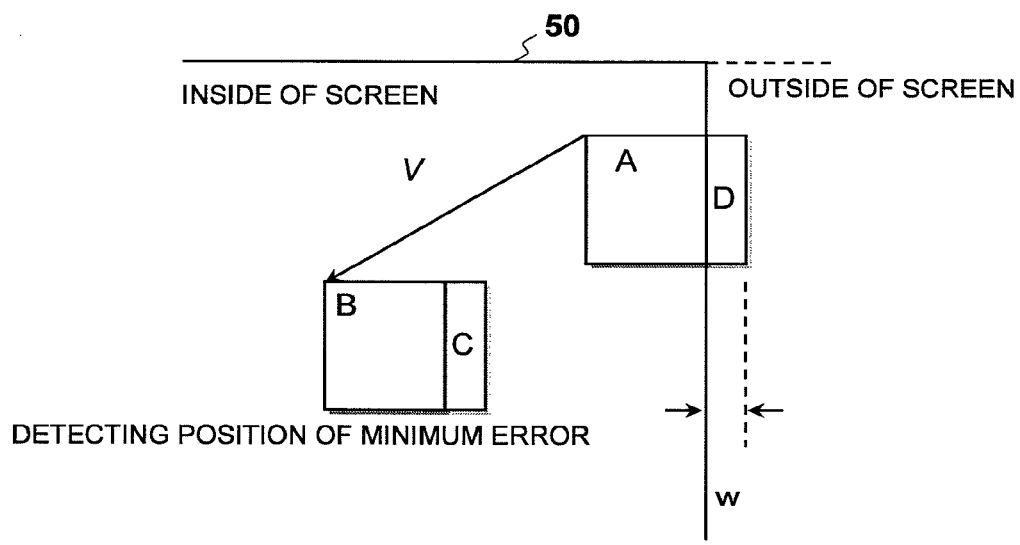
FIG. 5 is an explanatory drawing illustrating how to generate an extended reference image of a peripheral image of a reference image, in a compressed dynamic image encoding device according to Embodiment 1 of the present invention illustrated in FIG. 3, to which the reference image screen extension unit 11 illustrated in FIG. 4 is appended, in order to realize an unrestricted motion vector (UMV) adopted in the MPEG-4 encoding method.

Image information of the off-screen reference image (D) is generated on the basis of the image information of the yet another reference image (C) (refer to FIG. 5).

In another preferred embodiment, the on-screen reference image includes plural starting reference images (91, 92, 93).

Plural extended straight lines (L1, L2, L3) exist between the off-screen reference image (90) and the plural starting reference images (91, 92, 93).

Plural similarities of the reference image (91, 96, 97; 92, 94, 98; 93, 95, 99) on each extended straight line of the plural extended straight lines (L1, L2, L3) are calculated, and the extended straight line (L2) of the highest degree of similarity of the plural similarities is selected.

Figure 9:
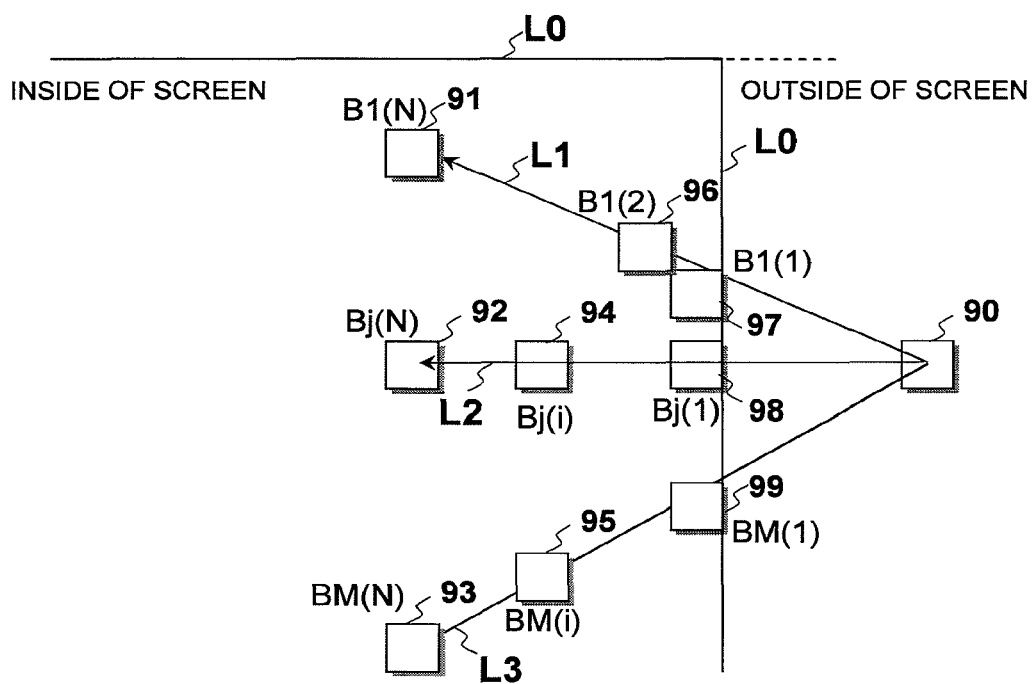
FIG. 9 is an explanatory drawing illustrating how to generate an extended reference image of a peripheral image of a reference image, in a compressed dynamic image encoding device according to Embodiment 1 of the present invention illustrated in FIG. 3, to which the reference image screen extension unit 11 is appended, in order to realize an unrestricted motion vector (UMV) adopted in the MPEG-4 encoding method.

The image information of the off-screen reference image (90) is generated on the basis of the image information of the reference image (92, 94, 98) of the extended straight line (L2) with the highest degree of similarity (refer to FIG. 9).

In further another preferred embodiment, the image information of the off-screen reference image (90) is generated on the basis of the statistical processing result of the image information of the reference image (92, 94, 98) of the extended straight line (L2) with the highest degree of similarity (refer to FIG. 9).

In a specific embodiment, the information indicative of whether or not the off-screen reference image is generated in the upward direction, in the downward direction, in the left direction, or in the right direction of the on-screen reference image is appended to the encoded video output signal.

(2) In a compressed dynamic image decoding device according to an embodiment from another viewpoint, a motion vector is extracted by decoding an encoded video input signal.

A motion-compensated reference image as a predicted image is generated from the motion vector and the reference image read from the frame memory (76, 86).

The reference image to be stored in the frame memory (76, 86) is generated by adding the motion-compensated reference image and the result of processing of decoding, inverse quantization, and inverse orthogonal transform performed to the encoded video input signal.

Figure 7:
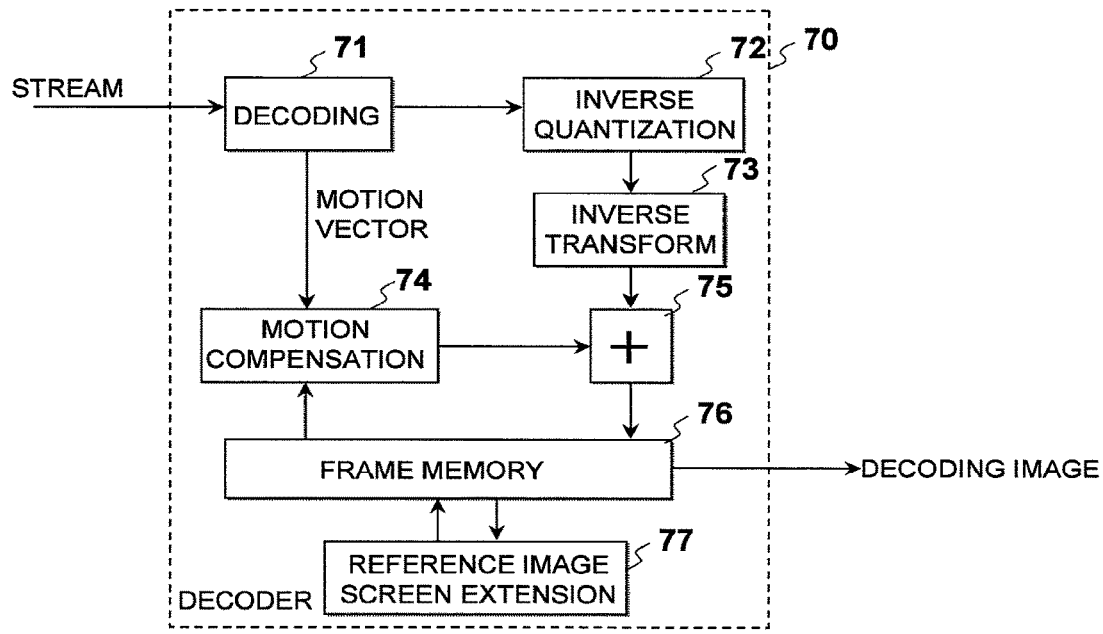
FIG. 7 is a drawing illustrating a configuration of a compressed dynamic image decoding device (decoder) according to Embodiment 2 of the present invention, which decodes an MPEG video stream as an encoded video output signal generated by the compressed dynamic image encoding device (encoder) according to Embodiment 1 of the present invention illustrated in FIG. 3.
Figure 8:
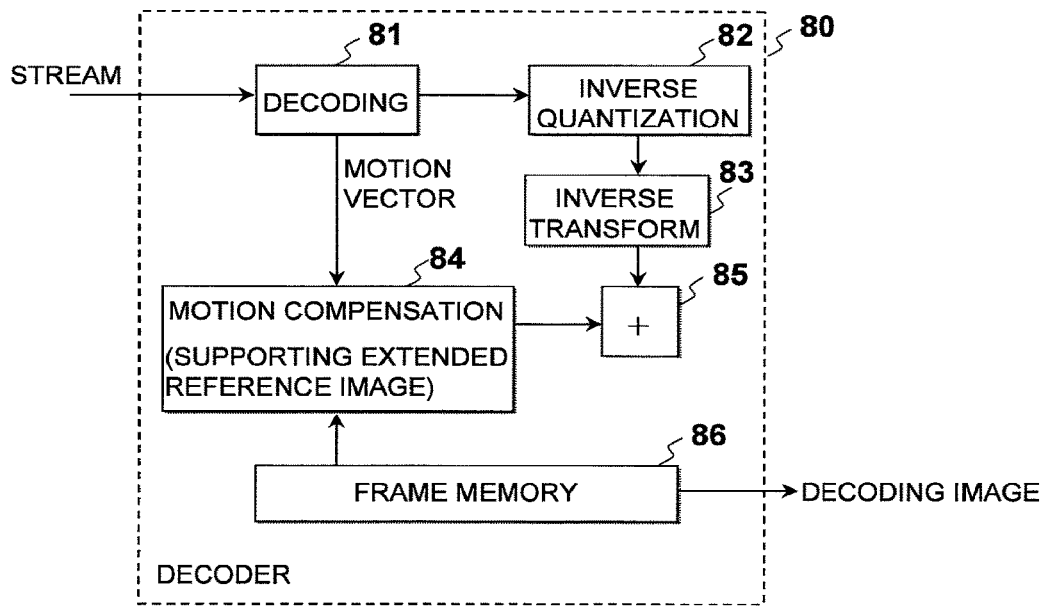
FIG. 8 is a drawing illustrating another configuration of a compressed dynamic image decoding device (decoder) according to Embodiment 3 of the present invention, which decodes an MPEG video stream as an encoded video output signal generated by the compressed dynamic image encoding device (encoder) according to Embodiment 1 of the present invention illustrated in FIG. 3.

In the compressed dynamic image decoding device 70, a decoded video output signal is generated from the frame memory (76, 86) (refer to FIGS. 7 and 8).

The reference image comprises on-screen reference images (A, B, C) located inside a video display screen, and an off-screen reference image (D) located outside the video display screen. The off-screen reference image (D) is generated based on the positional relationship of plural similar reference images (A, B) of the on-screen reference images (A, B, C) (refer to FIG. 5).

According to the embodiment, the off-screen reference image (D) is generated based on the positional relationship of plural similar reference images (A, B) of the on-screen reference images (A, B, C); accordingly, it is possible to improve the accuracy of an extended reference image, when motion compensation from an off-screen peripheral area is enabled in compressed dynamic image decoding process.

In a preferred embodiment, one reference image (A) of the similar reference images (A, B) of the on-screen reference images (A, B, C) is located in close vicinity of the boundary line (50) between the on-screen reference image and the off-screen reference image.

Another reference image (B) of the similar reference images (A, B) is located inside the on-screen reference image, spaced out from the boundary line (50) farther than the one reference image (A).

The off-screen reference image (D) is located in the closest vicinity to the one reference image (A) across the boundary line (50).

A yet another reference image (C) of the on-screen reference images (A, B, C) is located in close vicinity to the another reference image (B), in positional relationship analogous to the positional relationship of the one reference image (A) and the off-screen reference image (D).

Image information of the off-screen reference image (D) is generated on the basis of the image information of the yet another reference image (C) (refer to FIG. 5).

In another preferred embodiment, the on-screen reference image includes plural starting reference images (91, 92, 93).

Plural extended straight lines (L1, L2, L3) exist between the off-screen reference image (90) and the plural starting reference images (91, 92, 93).

Plural similarities of the reference image (91, 96, 97; 92, 94, 98; 93, 95, 99) on each extended straight line of the plural extended straight lines (L1, L2, L3) are calculated, and the extended straight line (L2) of the highest degree of similarity of the plural similarities is selected.

The image information of the off-screen reference image (90) is generated on the basis of the image information of the reference image (92, 94, 98) of the extended straight line (L2) with the highest degree of similarity (refer to FIG. 9).

In further another preferred embodiment, the image information of the off-screen reference image (90) is generated on the basis of the statistical processing result of the image information of the reference image (92, 94, 98) of the extended straight line (L2) with the highest degree of similarity (refer to FIG. 9).

In a specific embodiment, the information indicative of whether or not the off-screen reference image is generated in the upward direction, in the downward direction, in the left direction, or in the right direction of the on-screen reference image is extracted from the encoded video input signal.

Generation of the off-screen reference image with respect to the direction of which the information indicates "not" is omitted.

2. Further Detailed Description of the Embodiments

The embodiments are explained in more detail. In the entire diagrams for explaining the embodiments of the present invention, the same symbol is attached to a component which has the same function, and the repeated explanation thereof is omitted.

Embodiment 1

<<A Configuration of a Compressed Dynamic Image Encoding Device>>

FIG. 3 illustrates a configuration of the compressed dynamic image encoding device (encoder) according to Embodiment 1 of the present invention.

A compressed dynamic image encoding device (encoder) 1000 according to Embodiment 1 of the present invention illustrated in FIG. 3 comprises, as is the case with the compressed dynamic image encoding device illustrated in FIG. 1, a subtractor 1, an orthogonal transformer 2, a quantizer 3, an encoder 4, an inverse quantizer 5, an inverse orthogonal transformer 6, an adder 7, a motion compensation unit 8, a motion vector searching unit 9, and a frame memory 10.

In the compressed dynamic image encoding device 1000 according to Embodiment 1 of the present invention illustrated in FIG. 3, a reference image screen extension unit 11, which is not included in the compressed dynamic image encoding device illustrated in FIG. 1, is additionally coupled to the frame memory 10.

<<A Configuration of the Reference Image Screen Extension Unit>>

Figure 4:
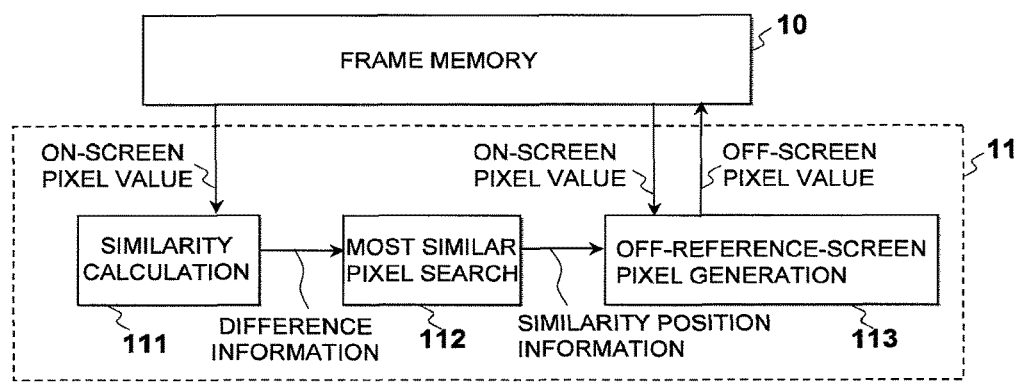
FIG. 4 is a drawing illustrating a configuration of a reference image screen extension unit 11 appended to the compressed dynamic image encoding device (encoder) according to Embodiment 1 of the present invention illustrated in FIG. 3.

FIG. 4 illustrates a configuration of the reference image screen extension unit 11 appended to the compressed dynamic image encoding device (encoder) 1000 according to Embodiment 1 of the present invention illustrated in FIG. 3.

The reference image screen extension unit 11 illustrated in FIG. 4 comprises a similarity calculating unit 111, a most similar pixel search unit 112, and an off-reference-screen pixel generation unit 113. An on-screen pixel value is supplied to the similarity calculating unit 111 of the reference image screen extension unit 11 from the frame memory 10. Difference information is supplied to the most similar pixel search unit 112 from the similarity calculating unit 111. Similarity position information is supplied to the off-reference-screen pixel generation unit 113 from the most similar pixel search unit 112. An on-screen pixel value is supplied to the off-reference-screen pixel generation unit 113 from the frame memory 10. An off-screen pixel value is supplied to the frame memory 10 from the off-reference-screen pixel generation unit 113.

<<A Generation Method of an Extended Reference Image>>

FIG. 5 is an explanatory drawing illustrating how to generate an extended reference image of a peripheral image of a reference image, in the compressed dynamic image encoding device according to Embodiment 1 of the present invention illustrated in FIG. 3, to which the reference image screen extension unit 11 illustrated in FIG. 4 is appended, in order to realize an unrestricted motion vector (UMV) adopted in the MPEG-4 encoding method.

In FIG. 5, a boundary line 50 is a line indicating a boundary between the inside of the screen and the outside thereof. In the screen inside the boundary line 50, many reference images A, B, C, - - - exist. In order to realize an unrestricted motion vector (UMV) adopted by the MPEG-4 encoding method, it is necessary to generate an extended reference image D outside of the boundary line 50.

For example, in the case of generating the extended reference image D outside the boundary line 50, in the closest vicinity to the on-screen reference image A located in close vicinity to the boundary line 50, first, the on-screen reference image B which is most similar to the on-screen reference image A located in close vicinity to the boundary line 50 is selected by searching many reference images inside the boundary line 50. Consequently, a movement amount and a movement direction are determined from the positional relationship of the boundary on-screen reference image A and the most similar on-screen reference image B, and a vector V is generated.

Next, the on-screen reference image C, which is located in the closest vicinity to the most similar on-screen reference image B and in the nearly same positional relationship as the positional relationship between the boundary on-screen reference image A and the external extended reference image D, is copied and pasted at the position of the external extended reference image D; accordingly, the extended reference image D is generated.

Similarly in the following, extended reference images are generated in a necessary width w of the horizontal direction, by repeating the same processing as the above on plural boundary on-screen reference images of the boundary line 50 in the vertical direction. It is also possible to generate extended reference images in a necessary width of the vertical direction, by repeating the same processing on plural boundary on-screen reference images of the boundary line 50 in the horizontal direction.

Figure 6:
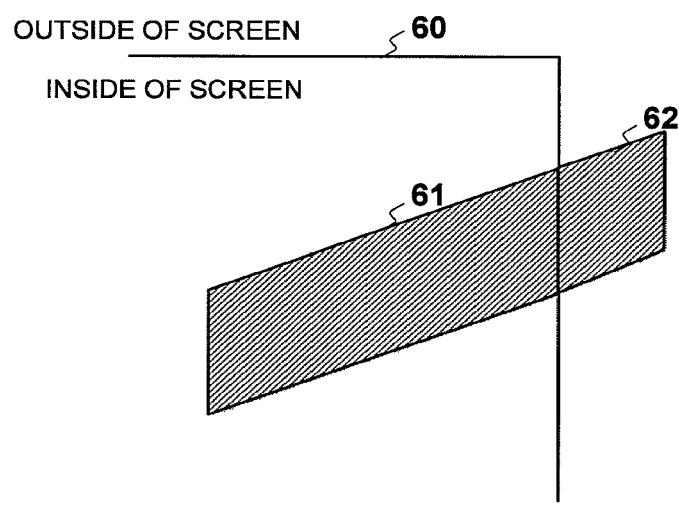
FIG. 6 is an explanatory drawing illustrating how to generate a reference image of an object located inside a screen and outside the screen, by the generation method of an extended reference image according to Embodiment 1 of the present invention illustrated in FIG. 5.

FIG. 6 is an explanatory drawing illustrating how to generate a reference image of an object located inside a screen and outside the screen, by the generation method of an extended reference image according to Embodiment 1 of the present invention illustrated in FIG. 5.

In FIG. 6, a boundary line 60 is a line which indicates a boundary between the inside of the screen and the outside thereof, a reference image 61 of an object exists in the screen inside the boundary line 60, and an extended reference image 62 exists outside the screen of the outside of the boundary line 60.

According to the generation method of the extended reference image according to Embodiment 1 of the present invention illustrated in FIG. 6, the locating direction (the vector V) of the reference image 61 of the object in the screen is considered to the extended reference image 62 which is an image outside a screen. Accordingly, the shape of the extended reference image 22 outside the screen matches with the actual shape with a high accuracy. As a result, it is possible to obtain the following effects. (1) The difference signal in the portion of an extended reference image becomes small. (2) It is possible to select a pixel of the extended reference image, causing a decrease in the electric power of the difference signal and an increase in encoding efficiency, in addition, the magnitude and direction of the motion vector of a block to be encoded become the same as those of the motion vector of the neighboring blocks, and the amount of code of the motion vector becomes small.

Embodiment 2

<<A Configuration of a Compressed Dynamic Image Decoding Device>>

FIG. 7 illustrates a configuration of a compressed dynamic image decoding device (decoder) according to Embodiment 2 of the present invention, which decodes an MPEG video stream as an encoded video output signal generated by the compressed dynamic image encoding device (encoder) according to Embodiment 1 of the present invention illustrated in FIG. 3.

A compressed dynamic image decoding device (decoder) 70 illustrated in FIG. 7 comprises a decoder 71, an inverse quantizer 72, an inverse orthogonal transformer 73, a motion compensation unit 74, an adder 75, a frame memory 76, and a reference image screen extension unit 77.

An MPEG video stream as an encoded video output signal is supplied to the decoder 71 which performs the signal processing of variable-length decoding (VLD). An output signal of the decoder 71 is supplied to one input terminal of the adder 75 via the inverse quantizer 72 which performs an inverse quantization process, and the inverse orthogonal transformer 73 which performs inverse orthogonal transform, such as inverse discrete cosine transform (IDCT). From an output terminal of the decoder 71, a motion vector is generated and supplied to the motion compensation unit 74. The motion compensation unit 74 generates a motion-compensated reference image (predicted image) from the motion vector and the reference image read from frame memory 76, and supplies it to the other input terminal of the adder 75. Therefore, the adder 75 performs addition of the output of the inverse orthogonal transform performed by the inverse orthogonal transformer 73 and the predicted image, and a decoded video signal is generated from the frame memory 76.

In the compressed dynamic image encoding device according to Embodiment 1 of the present invention illustrated in FIG. 3, an extended reference image is generated with the use of the reference image screen extension unit 11 illustrated in FIG. 4, in order to realize the unrestricted motion vector (UMV) adopted in the encoding method of MPEG-4, as illustrated in FIG. 5 and FIG. 6.

In the compressed dynamic image decoding device according to Embodiment 2 of the present invention illustrated in FIG. 7, the reference image screen extension unit 77 is appended, in order to decode the MPEG video stream which adopts the unrestricted motion vector (UMV) using the extended reference image generated by the compressed dynamic image encoding device illustrated in FIG. 3 with the reference image screen extension unit 11 illustrated in FIG. 4. That is, in the compressed dynamic image decoding device of FIG. 7, the extended reference image outside a screen is generated from an on-screen reference image using the reference image screen extension unit 77, according to the MPEG video stream adopting the unrestricted motion vector (UMV), supplied at the time of a decoding. With the use of an off-screen extended reference image, the compressed dynamic image decoding process is performed for an MPEG-4 encoded video stream which adopts a unrestricted motion vector (UMV) enabling the motion compensation from the peripheral area of the outside of the screen.

The compressed dynamic image decoding device illustrated in FIG. 7 which performs the same reference image screen extension method as described above decodes a video stream precisely. This is because it is difficult to decode a precise image, unless the encoding device and the decoding device always hold the same reference screen. Therefore, the reference image screen extension unit 77 of the compressed dynamic image decoding device illustrated in FIG. 7 can generate an off-screen extended reference image from an on-screen reference image when performing the compressed dynamic image decoding process, by the same method as the reference image screen extension unit of the compressed dynamic image encoding device illustrated in FIG. 5 and FIG. 6. When the reference image screen extension unit 77 generates an off-screen extended reference image from an on-screen reference image by the same method as one illustrated in FIG. 9 to be described later, it is necessary that both of the compressed dynamic image encoding device and the compressed dynamic image decoding device employ the method illustrated in FIG. 9. It is also possible to employ jointly the method illustrated in FIG. 5 and FIG. 6 and the method illustrated in FIG. 9, or to employ jointly two kinds or three kinds of methods including the image extension in the conventional MPEG-4 or the like. In the case of the present joint employment, it is necessary to specify which method is employed in the screen extension processing, when encoding each frame in a video stream, then in the decoding device, it is possible to obtain a precise reproduced image by decoding each frame after performing the screen extension processing by the method specified.

Embodiment 3

<<Other Configurations of the Compressed Dynamic Image Decoding Device>>

FIG. 8 illustrates another configuration of a compressed dynamic image decoding device (decoder) according to Embodiment 3 of the present invention, which decodes an MPEG video stream as an encoded video output signal generated by the compressed dynamic image encoding device (encoder) according to Embodiment 1 of the present invention illustrated in FIG. 3.

A compressed dynamic image decoding device (decoder) 80 illustrated in FIG. 8 comprises a decoder 81, an inverse quantizer 82, an inverse orthogonal transformer 83, a motion compensation unit 84, an adder 85, and a frame memory 86. In the compressed dynamic image decoding device (decoder) 80 illustrated in FIG. 8, the decoder 81, the inverse quantizer 82, the inverse orthogonal transformer 83, the adder 85, and the frame memory 86 have operational functions respectively equivalent to the functions of the decoder 71, the inverse quantizer 72, the inverse orthogonal transformer 73, the adder 75, and the frame memory 76 comprised in the compressed dynamic image decoding device (decoder) 70 illustrated in FIG. 7. The motion compensation unit 84 included in the compressed dynamic image decoding device (decoder) 80 illustrated in FIG. 8 has operational functions of both of the motion compensation unit 74 and the reference image screen extension unit 77 of the compressed dynamic image decoding device (decoder) 70 illustrated in FIG. 7. Therefore, as is the case with the compressed dynamic image decoding device illustrated in FIG. 7, the compressed dynamic image decoding device illustrated in FIG. 8 can generate, at the time of decoding, an off-screen extended reference image from an on-screen reference image with the use of the motion compensation unit 84 according to the MPEG video stream adopting an unrestricted motion vector (UMV). Even the compressed dynamic image decoding device illustrated in FIG. 8 can perform the compressed dynamic image decoding process of the MPEG-4 encoded video stream adopting an unrestricted motion vector (UMV) which enables motion compensation from the peripheral area outside the screen, by using the off-screen extended reference image.

The motion compensation unit 84 of the compressed dynamic image decoding device illustrated in FIG. 8 can generate an off-screen extended reference image from an on-screen reference image at the time of a compressed dynamic image decoding process, by the same method as the method illustrated in FIG. 5 and FIG. 6, as is the case with the reference image screen extension unit 77 of the compressed dynamic image decoding device illustrated in FIG. 7. The motion compensation unit 84 can also generate an off-screen extended reference image from an on-screen reference image by the same method as the method illustrated in FIG. 9 to be described later.

Embodiment 4

<<Other Generation Methods of an Extended Reference Image>>

FIG. 9 is an explanatory drawing illustrating how to generate an extended reference image of a peripheral image of a reference image, in the compressed dynamic image encoding device according to Embodiment 1 of the present invention illustrated in FIG. 3, to which the reference image screen extension unit 11 is appended, in order to realize an unrestricted motion vector (UMV) adopted in the MPEG-4 encoding method.

In FIG. 9, a boundary line L0 is a line which indicates a boundary between the inside of the screen and the outside thereof. In the screen inside the boundary line L0, many reference images 91 to 99 exist. In order to realize an unrestricted motion vector (UMV) adopted in the MPEG-4 encoding method, it is necessary to generate an extended reference image 90 located outside the boundary line L0.

For example, the similarity of plural first on-screen reference images 91, 96, and 97, arranged on a straight line L1 between the extended reference image 90 and the starting first on-screen reference image 91, is calculated by the reference image screen extension unit 11 of the compressed dynamic image encoding device according to Embodiment 1 of the present invention illustrated in FIG. 3. Next, the similarity of plural second on-screen reference images 92, 94, and 98, arranged on a straight line L2 between the extended reference image 90 and the starting second on-screen reference image 92, is calculated by the reference image screen extension unit 11 of the compressed dynamic image encoding device according to Embodiment 1 of the present invention illustrated in FIG. 3. In the same manner, the similarity of plural third on-screen reference images 93, 95, and 99, arranged on a straight line L3 between the extended reference image 90 and the starting third on-screen reference image 93, is calculated by the reference image screen extension unit 11 of the compressed dynamic image encoding device according to Embodiment 1 of the present invention illustrated in FIG. 3. According to the highest degree of similarity obtained by the present similarity calculation, the extended reference image 90 located outside the boundary line L0 is determined.

That is, when it is assumed that the extended straight line which has the highest degree of similarity is the straight line L2 for example, it is possible to determine a luminance signal and a hue signal of the extended reference image 90 located outside the boundary line L0, by multiplying with predetermined coefficients, summing, and averaging each value of a luminance signal and a hue signal of the on-screen second reference images 92, 94, and 98 arranged on the straight line L2.

It is needless to say that the compressed dynamic image decoding device (decoder) as illustrated in FIG. 7 and FIG. 8 can be employed, in order to decode an MPEG-TS which adopts an unrestricted motion vector using an extended reference image generated by the compressed dynamic image encoding device which employs the generation method of the extended reference image of the peripheral image illustrated in FIG. 9.

Up to this point, the invention accomplished by the present inventors has been concretely explained based on various embodiments. However, it cannot be overemphasized that the present invention is not restricted to the embodiments, and it can be changed variously in the range which does not deviate from the gist.

Other Embodiments

For example, the subtractor 1, the orthogonal transformer 2, the quantizer 3, the encoder 4, the inverse quantizer 5, the inverse orthogonal transformer 6, the adder 7, the motion compensation unit 8, the motion vector searching unit 9, and the reference image screen extension unit 11 which are included in the compressed dynamic image encoding device 1000 illustrated in FIG. 3 are not restricted to signal processing by a dedicated hardware, respectively. That is, it is possible to replace these kinds of signal processing by the software process performed with a central processing unit (CPU) included in the compressed dynamic image encoding device 1000.

Also, the decoder 71, the inverse quantizer 72, the inverse orthogonal transformer 73, the motion compensation unit 74, the adder 75, and the reference image screen extension unit 77 which are included in the compressed dynamic image decoding device (decoder) 70 illustrated in FIG. 7 are not restricted to signal processing by a dedicated hardware, respectively. That is, it is possible to replace these kinds of signal processing by the software process performed with a central processing unit (CPU) included in the compressed dynamic image decoding device 70.

Furthermore, the extension direction in generating the extended reference image D outside the boundary line 50 between the inside of the screen of a reference image and the outside of the screen as illustrated in FIG. 5 is not restricted to all sides of the square reference image. For example, it is also possible to limit the generation direction of the extended reference image based on the movement direction of a dynamic image photographing device, outputted from an acceleration sensor mounted in the dynamic image photographing device. It is also possible to limit the generation direction of the extended reference image to the X direction and the Y direction of a movement vector of the dynamic image photographing device. That is, when limiting the generation direction, by superimposing on a video stream the information on in which direction the generation of the extended reference image is limited, and the information on in which direction the generation of the extended reference image is not limited, it is possible to simplify the decoding process of the dynamic image decoding device which decodes the video stream. For example, the information (limitation information) which limits generation of an extended reference image can be set as "1" when the generation of the extended reference image is not limited, and as "0" when the generation of the extended reference image is limited, in each direction of the screen, and the signal can be configured as 4-bit information arranged in the order corresponding to up, down, left, and right. For example, when the 4-bit information is "0001", it means that it is necessary to generate an extended reference image in the right direction of a screen, as in the case where the camera is running rightward in a P frame (unidirectional predictive frame). It is possible to append the present limitation information to every frame of an encoded image, or to every plural frames. Since in the case of the former, it is possible to set up the limitation direction appropriately, in adapting to the motion of a camera etc. in units of frames, it is possible to limit the generation of the extended reference image without reducing encoding efficiency. As for the direction where the generation of the extended reference image is limited, the extension method adopted in MPEG-4 etc. can be employed.

Furthermore, when the image of a top field differs from the image of a bottom field for every line as in an interlace image, the video input signal to be encoded is divided into a top field and a bottom field, and generation of an extended reference image as illustrated in FIG. 5 is performed in each field.

INDUSTRIAL APPLICABILITY

The present invention is not restricted to the encoding method and decoding method of MPEG-4 adopting an unrestricted motion vector (UMV) which enables the motion compensation from the peripheral area outside the screen.

The present invention is widely applicable to a compressed dynamic image encoding device, a compressed dynamic image decoding device, compressed dynamic image encoding method, and compressed dynamic image decoding method, which utilize the temporal-correlation-based inter-frame prediction coding, motion vector detection, motion compensation, an extended reference image, etc.

What is claimed is:

1. A compressed dynamic image encoding device
   operable to generate a motion vector by searching a reference image read from a frame memory for an image area most similar to an image area of a video input signal to be encoded;
   operable to generate a motion-compensated reference image as a predicted image, from the motion vector and the reference image read from the frame memory;
   operable to generate a prediction residual, by subtracting the motion-compensated reference image from the video input signal to be encoded;
   operable to generate the reference image to be stored in the frame memory, by adding the motion-compensated reference image and the result of processing of orthogonal transform, quantization, inverse quantization, and inverse orthogonal transform performed to the prediction residual; and
   operable to generate an encoded video output signal by the processing of orthogonal transform, quantization, and variable-length encoding performed to the prediction residual,
   wherein the reference image comprises an on-screen reference image located inside a video display screen, and an off-screen reference image located outside the video display screen,
   wherein the off-screen reference image is generated based on the positional relationship of a plurality of similar reference images of the on-screen reference image,
   wherein one reference image of the similar reference images of the on-screen reference image is located in close vicinity to a boundary line between the on-screen reference image and the off-screen reference image,
   wherein another reference image of the similar reference images is located inside the on-screen reference image, spaced out from the boundary line farther than the one reference image,
   wherein the off-screen reference image is located in the closest vicinity to the one reference image across the boundary line,
   wherein a yet another reference image of the on-screen reference image is located in close vicinity to the another reference image, in positional relationship analogous to the positional relationship of the one reference image and the off-screen reference image, and
   wherein image information of the off-screen reference image is generated on the basis of image information of the yet another reference image.

2. The compressed dynamic image encoding device according to claim 1,
   wherein the information indicative of whether or not the off-screen reference image is generated in the upward direction, in the downward direction, in the left direction, or in the right direction of the on-screen reference image is appended to the encoded video output signal.

3. A compressed dynamic image decoding device
   operable to extract a motion vector by decoding an encoded video input signal;
   operable to generate a motion-compensated reference image as a predicted image, from the motion vector and a reference image read from a frame memory;
   operable to generate the reference image to be stored in the frame memory, by adding the motion-compensated reference image and the result of processing of decoding, inverse quantization, and inverse orthogonal transform performed to the encoded video input signal; and
   operable to generate a decoded video output signal from the frame memory,
   wherein the reference image comprises an on-screen reference image located inside a video display screen, and an off-screen reference image located outside the video display screen,
   wherein the off-screen reference image is generated based on the positional relationship of a plurality of on-screen reference image areas of a plurality of similar reference images of the on-screen reference image,
   wherein one reference image of the similar reference images of the on-screen reference image is located in close vicinity to a boundary line between the on-screen reference image and the off-screen reference image,
   wherein another reference image of the similar reference images is located inside the on-screen reference image, spaced out from the boundary line farther than the one reference image, wherein the off-screen reference image area of the off-screen reference image is located in the closest vicinity to the one reference image across the boundary line, wherein a yet another reference image area of a yet another reference image of the on-screen reference image is located in close vicinity to the another reference image area of the another reference image, in positional relationship analogous to the positional relationship of the one reference image area and the off-screen reference image area, and wherein image information of the off-screen reference image is generated on the basis of image information of the yet another reference image.

4. The compressed dynamic image decoding device according to claim 3, wherein the information indicative of whether or not the off-screen reference image is generated in the upward direction, in the downward direction, in the left direction, or in the right direction of the on-screen reference image is extracted from the encoded video input signal, and wherein generation of the off-screen reference image with respect to the direction of which the information indicates "not" is omitted.

5. A compressed dynamic image encoding method comprising the steps of:

generating a motion vector by searching a reference image read from a frame memory for an image area most similar to an image area of a video input signal to be encoded;

generating a motion-compensated reference image as a predicted image, from the motion vector and the reference image read from the frame memory;

generating a prediction residual, by subtracting the motion-compensated reference image from the video input signal to be encoded;

generating the reference image to be stored in the frame memory, by adding the motion-compensated reference image and the result of processing of orthogonal transform, quantization, inverse quantization, and inverse orthogonal transform performed to the prediction residual; and generating an encoded video output signal by the processing of orthogonal transform, quantization, and variable-length encoding performed to the prediction residual, wherein the reference image comprises an on-screen reference image located inside a video display screen, and an off-screen reference image located outside the video display screen, wherein the off-screen reference image is generated based on the positional relationship of a plurality of on-screen reference image areas of a plurality of similar reference images of the on-screen reference image, wherein one reference image area of one of the similar reference images of the on-screen reference image is located in close vicinity to a boundary line between the on-screen reference image and the off-screen reference image, wherein another reference image area of another of the similar reference images is located inside the on-screen reference image, spaced out from the boundary line farther than the one reference image, wherein off-screen reference image area of the off-screen reference image is located in the closest vicinity to the one reference image area across the boundary line, wherein a yet another reference image area of a yet another reference image of the on-screen reference image is located in close vicinity to the another reference image area of the another reference image, in positional relationship analogous to the positional relationship of the one reference image and the off-screen reference image area, and wherein image information of the off-screen reference image is generated on the basis of image information of the yet another reference image.

6. The compressed dynamic image encoding method according to claim 5, wherein the information indicative of whether or not the off-screen reference image is generated in the upward direction, in the downward direction, in the left direction, or in the right direction of the on-screen reference image is appended to the encoded video output signal.

7. A compressed dynamic image decoding method comprising the steps of:

extracting a motion vector by decoding an encoded video input signal;

generating a motion-compensated reference image as a predicted image, from the motion vector and a reference image read from a frame memory;

generating the reference image to be stored in the frame memory, by adding the motion-compensated reference image and the result of processing of decoding, inverse quantization, and inverse orthogonal transform performed to the encoded video input signal; and generating a decoded video output signal from the frame memory, wherein the reference image comprises an on-screen reference image located inside a video display screen, and an off-screen reference image located outside the video display screen, wherein the off-screen reference image is generated based on the positional relationship of a plurality of on-screen reference image areas of a plurality of similar reference images of the on-screen reference image, wherein one reference image area of one of the similar reference images of the on-screen reference image is located in close vicinity to a boundary line between the on-screen reference image and the off-screen reference image, wherein another reference image area of another of the similar reference images is located inside the on-screen reference image, spaced out from the boundary line farther than the one reference image, wherein off-screen reference image area of the off-screen reference image is located in the closest vicinity to the one reference image area across the boundary line, wherein a yet another reference image area of a yet another reference image of the on-screen reference image is located in close vicinity to the another reference image area of the another reference image, in positional relationship analogous to the positional relationship of the one reference image area and the off-screen reference image area, and wherein image information of the off-screen reference image is generated on the basis of image information of the yet another reference image.

8. The compressed dynamic image decoding method according to claim 7, wherein the information indicative of whether or not the off-screen reference image is generated in the upward direction, in the downward direction, in the left direction, or in the right direction of the on-screen reference image is extracted from the encoded video input signal, and wherein generation of the off-screen reference image with respect to the direction of which the information indicates "not" is omitted.

9. The compressed dynamic image encoding device according to claim 1, comprising the frame memory and a reference image screen extension unit connected to the frame memory,
   wherein the reference image screen extension unit is configured to generate a difference information based on pixel values of the on-screen reference image,
   wherein the reference image screen extension unit is configured to generate an information of the positional relationship of the similar reference images of the on-screen reference image based on the difference information, and
   wherein the reference image screen extension unit is configured to generate pixel value of the off-screen reference image based on the information of the positional relationship.

10. The compressed dynamic image decoding device according to claim 3, comprising the frame memory and a reference image screen extension unit connected to the frame memory,
    wherein the reference image screen extension unit is configured to generate a difference information based on pixel values of the on-screen reference image,
    wherein the reference image screen extension unit is configured to generate an information of the positional relationship of the similar reference images of the on-screen reference image based on the difference information, and
    wherein the reference image screen extension unit is configured to generate pixel value of the off-screen reference image based on the information of the positional relationship.

11. The compressed dynamic image encoding method according to claim 5,
    wherein a reference image screen extension unit is connected to the frame memory,
    wherein the reference image screen extension unit is configured to generate a difference information based on pixel values of the on-screen reference image,
    wherein the reference image screen extension unit is configured to generate an information of the positional relationship of the similar reference images of the on-screen reference image based on the difference information, and
    wherein the reference image screen extension unit is configured to generate pixel value of the off-screen reference image based on the information of the positional relationship.

12. The compressed dynamic image decoding method according to claim 7,
    wherein a reference image screen extension unit is connected to the frame memory,
    wherein the reference image screen extension unit is configured to generate a difference information based on pixel values of the on-screen reference image,
    wherein the reference image screen extension unit is configured to generate an information of the positional relationship of the similar reference images of the on-screen reference image based on the difference information, and
    wherein the reference image screen extension unit is configured to generate pixel value of the off-screen reference image based on the information of the positional relationship.

13. The compressed dynamic image encoding device according to claim 9, further comprising a subtractor, an orthogonal transformer, a quantizer, an encoder, an inverse quantizer, an inverse orthogonal transformer, an adder, a motion compensation unit, and a motion vector searching unit,
    wherein the motion vector searching unit is configured to generate the motion vector by searching the reference image read from the frame memory for an image area most similar to the image area of the video input signal to be encoded,
    wherein the motion compensation unit is configured to generate the motion-compensated reference image as the predicted image, from the motion vector and the reference image read from the frame memory,
    wherein the subtractor is configured to generate the prediction residual, by subtracting the motion-compensated reference image from the video input signal to be encoded,
    wherein the adder is configured to add the motion-compensated reference image and the result of processing of orthogonal transform, quantization, inverse quantization, and inverse orthogonal transform performed to the prediction residual, so as to generate the reference image to be stored in the frame memory,
    wherein the encoded video output signal is generated by the processing of orthogonal transform performed to the prediction residual by the orthogonal transformer, the processing of quantization by the quantizer, and the processing of variable-length encoding by the encoder.

14. The compressed dynamic image decoding device according to claim 10, further comprising a decoder, an inverse quantizer, an inverse orthogonal transformer, a motion compensation unit, and an adder,
    wherein the decoder is configured to extract the motion vector by decoding the encoded video input signal,
    wherein the motion compensation unit is configured to generate the motion-compensated reference image as the predicted image, from the motion vector and the reference image read from the frame memory,
    wherein the adder is configured to add the motion-compensated reference image and the result of processing of decoding, inverse quantization, and inverse orthogonal transform performed to the encoded video input signal, so as to generate the reference image to be stored in the frame memory, and
    wherein the decoded video output signal is generated from the frame memory.

* * * * *